(12) United States Patent
Epworth et al.

(10) Patent No.: US 6,515,778 B1
(45) Date of Patent: Feb. 4, 2003

(54) POLARIZATION MODE DISPERSION COMPENSATION

(75) Inventors: Richard Edward Epworth, Sawbridgeworth (GB); Daniel A Watley, Cambridge (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/358,977

(22) Filed: Jul. 22, 1999

(51) Int. Cl.[7] .............................................. H04B 10/00
(52) U.S. Cl. .......................... 359/161; 359/130; 385/37
(58) Field of Search ................................ 359/161, 156, 359/154, 130; 385/37, 10

(56) References Cited

U.S. PATENT DOCUMENTS

| | | | |
|---|---|---|---|
| 4,953,939 A | 9/1990 | Epworth ...................... 359/173 |
| 5,473,457 A | 12/1995 | Ono ............................ 359/161 |
| 5,822,100 A | * 10/1998 | Robinson et al. ........... 359/161 |
| 5,949,560 A | * 9/1999 | Roberts et al. ......... 359/161 X |
| 6,271,952 B1 | * 8/2001 | Epworth ...................... 359/161 |
| 6,330,383 B1 | * 12/2001 | Cai et al. ...................... 385/37 |

FOREIGN PATENT DOCUMENTS

| | | | |
|---|---|---|---|
| EP | 0863626 A2 | * | 9/1998 |
| GB | 2184252 A | * | 6/1987 |
| WO | 97/50185 | | 12/1997 |

* cited by examiner

*Primary Examiner*—Thomas Mullen
(74) *Attorney, Agent, or Firm*—Lee, Mann, Smith, McWilliams Sweeney & Ohlson

(57) ABSTRACT

An apparatus and a method for compensating for polarisation mode dispersion in an optical signal. The apparatus includes a chirped Bragg reflector extending longitudinally along an optical waveguide, the waveguide being susceptible to stress birefringence; and at least one tuning element located at a position along the length of the waveguide. The tuning element is operable to, in use, apply a stress to the waveguide so as to alter the magnitude and the orientation of the birefringence of the waveguide for compensation of the polarisation mode dispersion of the optical signal. Higher order PMD compensation can be achieved by providing two such tuning elements along the waveguide.

18 Claims, 7 Drawing Sheets

US 6,515,778 B1

POLARIZATION MODE DISPERSION COMPENSATION

FIELD OF THE INVENTION

This invention relates to compensating for polarisation mode dispersion, particularly across the signal spectrum of an optical signal of an optical communications system, and to an optical element for providing a variable differential delay primarily but not exclusively for use in such polarisation mode dispersion compensation.

BACKGROUND TO THE INVENTION

Existing communications systems typically rely, for transmission over long distances, upon the use of nominally single mode optical fibres which carry optical signals and provide transmission of signal data at rates of 10 Gb/sec or more over distances of the order of 100 kilometers or greater. Although such fibres are nominally single mode, propagation of optical signals is generally characterised in such fibres by two orthogonally polarised $HE_{11}$ modes for which slightly different group velocities exist in the presence of birefringence.

An optical fibre may be regarded as a concatenation of birefringent elements through which the optical signal propagates. As the different modes of the signal will propagate through the fibre at different velocities due to the differing refractive indices experienced by the modes, the modes will become temporally separated.

For a given span of optical fibre, the difference in transmission time for these two modes (often referred to as "fast" and "slow" modes to indicate the difference in final propagation velocities) is termed polarisation mode dispersion (PMD). FIG. 1 shows a schematic representation of this effect, with both the fast and slow modes 10, 12 of the optical signal being launched into the optical fibre at time t. Both modes propagate along the fibre, with the faster mode 10 arriving at the end of the fibre span at time T and the slower mode 12 arriving at time T+dt, where dt is the difference in transit time between the signals due to polarisation mode dispersion.

FIG. 2 shows a part of a typical optical communication system that might include a polarisation mode dispersion compensator. An optical fibre (1) provides a transmission path for propagation.

It is known from U.S. Pat. No. 5,473,457 to analyse a received optical signal in a manner which permits the received optical signal to be separated into fast and slow mode components, the fast mode component then being subject to a compensating delay by means of transmission of both components through a polarisation maintaining optical fibre of pre-determined length and high polarisation dispersion to provide a differential delay, albeit a fixed differential delay.

FIG. 2 shows a part of a typical optical communication system that might include a polarisation mode dispersion compensator. An optical fibre (1) provides a transmission path for propagation of an optical signal from a polarised light emitting transmitter (2) to a receiver (3). This transmission path includes an erbium doped optical fibre amplifier (4), and, adjacent the receiver (3), a PMD compensator (5).

The optical fibre (1) is a nominally circular symmetric single mode fibre extending over a substantial distance. Over a distance of this length the departures from perfect circular symmetry of that fibre, for example as a result of bending strain, are liable to be of sufficient magnitude for the fibre to function as a concatenation of birefringent elements of random relative orientation, as described above. Consequently, such optical fibres require compensation for polarisation mode dispersion. Moreover, the birefringence of the fibres will change due to such effects as heating and cooling of the fibre, and changes in strains imparted to the fibre (particularly in overhead optical cables and cables affected by maintenance crews or other human intervention). Obviously, such systems require a PMD compensator that is variable.

It is known from WO97/50185 to compensate for PMD by splitting the received optical signal at the receiver into two polarisation states and to apply switched delays of different length to the separated components, thereby providing a variable delay, albeit a delay that is not continuously and smoothly variable, and that also requires a relatively complex optical switching configuration.

The inventor of the present invention has previously disclosed in U.S. Pat. No. 4,953,939 the use of an optical fibre chirped Bragg grating reflector in combination with a directional coupler to introduce a delay which is wavelength dependent because the periodicity of the Bragg grating varies with position along the fibre, so that different wavelengths are reflected from different positions along the fibre. In pending U.S. patent application Ser. No. 09/135,967 filed Aug. 18, 1998 (granted as U.S. Pat. No. 6,271,952), which is incorporated herein by reference, the present inventor provides an optical element for providing a variable differential delay and an associated method for polarisation mode dispersion compensation by separating the optical signal into fast and slow mode components and utilising a chirped Bragg reflector to provide a variable delay.

All of the above techniques relate to first order polarisation mode dispersion, as indicated in FIG. 1. Each technique requires the use of polarisation state controllers, to align with and separate the different polarisation states, prior to providing a differential delay to the separate states. It would be advantageous to provide a PMD compensator that does not require such a polarisation state controller.

GB2184252 discloses how the use of squeezer elements applying stress to an optical fibre may be used to change the birefringence of the fibre to produce an optical state-of-polarisation modulator.

The differential group delay is dependent upon the wavelength of the optical signal. The mechanism by which the PMD value of a fibre is seen to vary across the signal spectrum is often referred to as higher order PMD. As the differential group delay (DGD) due to PMD is not a single value across the signal bandwidth, accurate PMD compensation cannot simply be achieved by introducing a single value of differential delay in opposition to the differential group delay induced by the PMD of the fibre (as is described in the above techniques). For low values of PMD, the dispersion does indeed approximate to a single value across the signal bandwidth, thus permitting the use of such simple compensator designs as described above. However, for larger PMD values there exists a need to provide an improved method of providing a continuously variable optical delay and for compensating for polarisation mode dispersion in optical fibres across the signal spectrum.

SUMMARY OF THE INVENTION

In one aspect, the present invention provides an apparatus for compensating for polarisation mode dispersion, the apparatus comprising a chirped Bragg reflector extending longitudinally along an optical waveguide, said waveguide being susceptible to stress birefringence; and at least one tuning means located at a position along the length of said waveguide, said tuning means being operable, in use, to apply a stress to said waveguide so as to alter the magnitude and the orientation of the birefringence of said waveguide for compensation of the polarisation mode dispersion of the optical signal.

It is well known that with low chirp fibre gratings, quite low levels of birefringence, can cause significant PMD. This invention exploits this fact and provides a means of compensating for differing PMD. This approach has the advantage over PMD compensation techniques described in the prior art, in so far as it does not require a separate polarisation state controller to align with the different states prior to applying different delays to the orthogonal states.

Preferably, the apparatus comprises at least two of said tuning means, each tuning means being located at a different position along the length of said waveguide. Advantageously, such an apparatus may be used to affect the birefringence of the waveguide so as to compensate for the polarisation mode dispersion caused by the birefringence of a system such as an optical transmission system. By applying stress at at least two distinct points along the length of such a chirped Bragg reflector, different parts of the signal spectrum will undergo different birefringent conditions dependent upon where they are reflected within the Bragg reflector and hence polarisation mode dispersion compensation may be achieved across the signal spectrum of the optical signal. Consequently, the present invention provides a means of compensating for differing PMD values for different parts of the signal spectrum i.e. it is arranged to provide PMD compensation across the signal spectrum of an optical signal.

Preferably said optical waveguide comprises a birefringent material arranged such that the magnitude and orientation of the birefringence is in use controlled by stress imparted by said tuning means. The optical waveguide may be formed completely or partially from a material that is birefringent. By applying a simple single stress by each tuning means, it is possible to adjust the orientation and relative magnitude of the birefringence of the fibre so as to achieve the desired compensatory effect. The stress could of course be a compressive or a tensile stress.

Preferably said tuning means are arranged such that in use the position of the tuning means in relation to the waveguide may be adjusted. The longitudinal position of the tuning means in relation to the fibre may be adjusted to affect different parts of the signal spectrum. The orientation of the tuning means about the axis defined by the waveguide may be adjusted (i.e. may be controllable) so as to provide the desired orientation of stress in order to achieve the required birefringent conditions of the waveguide for optimum PMD compensation. Similarly, the area around the perimeter of the optical waveguide and/or the longitudinal length of the optical waveguide to which the tuning means applies the stress may be adjustable so as to allow a variation in the longitudinal length of the waveguide which would be affected by the stress imparted by the tuning means. This would permit a variation in the wavelength and wavelength range of the optical signal spectrum affected by the tuning means.

Preferably at least one of said control means comprises two squeezing means in mutual proximity, and arranged such that in use said squeezing means can apply pressure to said waveguide along respective axes at a relative angle of θ to each other, θ being greater than zero, so as to provide a transverse stress for tuning of said birefringence.

By providing such squeezing means, and controlling the magnitude and relative magnitude of the stresses applied by the squeezing means, it is possible to control both the magnitude and the orientation of the stress induced birefringence, and hence the associated PMD compensation.

Preferably said squeezing means comprises electrical actuators such as electrostrictive or magnetostrictive devices or piezoelectric devices. Alternatively, selectively controlling the temperatures of different parts of the waveguide could be used to apply stresses to the waveguide for selectively controlling the waveguide birefringence.

Preferably, θ is approximately 45°, the apparatus further comprising a third squeezing means, in mutual proximity with said first two squeezing means, arranged to apply pressure to said waveguide along an axis substantially perpendicular to one of said axes of said first two squeezing means.

Alternatively, the apparatus further comprises at least one longitudinal strain tuning means arranged such that in use a longitudinal tensile or compressive strain may be applied to at least a longitudinal section of said waveguide.

By applying either a longitudinal strain to a section of the waveguide, or orthogonal transverse strains to the waveguide, the chirp (and hence the associated reflection characteristics) may be adjusted. This might be used to compensate for variations in the waveguide characteristics or the variations in the telecommunications system associated with the PMD compensator due to ageing. By applying such strains, the grating bandpass may be adjusted to ensure alignment with the signal spectrum.

Alternatively, said optical waveguide may comprise an optical fibre, and at least one of said tuning means may comprise an actuator arranged to apply a variable bending moment to said fibre.

Preferably said Bragg reflector comprises a chirped sampled grating. This enables a single short grating to be used for any one of many different wavelength ranges (e.g. channels) as desired.

Preferably; the apparatus further comprises a control means for control of said tuning means, said control means being arranged to, in use, successively optimise the birefringence conditions of a pre-determined bandwidth of said optical signal.

Preferably wherein said optimisation is selected from maximising a monitor of the received eye opening, minimising the bit error rate or optimising the electrical spectrum of the return path of the optical signal from the apparatus. Each tuning means or part thereof (e.g. a squeezing element) might be sequentially adjusted so as to provide PMD compensation. Of course, if the appropriate control information signals were available relating to the different parts of the signal spectrum, all of the desired tuning means might be simultaneously adjusted. For instance, known techniques such as those disclosed in EP-0863626 could be utilised to determine the polarisation mode dispersion.

In another aspect, the present invention provides a telecommunication system comprising an apparatus as described above.

In a further aspect, the present invention provides a telecommunication system as described above, wherein the apparatus is being used to provide compensation for polarisation mode dispersion to an optical signal.

In a further aspect, the present invention provides a method for compensating for polarisation mode dispersion across the signal spectrum of an optical signal, the method comprising transmitting an optical signal along an optical waveguide which is susceptible to stress birefringence, and which has a chirped Bragg reflector extending longitudinally along said waveguide;

measuring the optical signal so as to provide an indication of the polarisation mode dispersion; and applying stress to said waveguide at a position along the length of said waveguide so as to adjust the waveguide birefringence for compensation of polarisation mode dispersion of the signal across the signal spectrum.

Preferably, the optical signal is measured so as to provide an indication of the polarisation mode dispersion across the signal bandwidth; and said stress is applied at at least two distinct positions along the length of said waveguide so as to adjust the waveguide birefringence for compensation of polarisation mode dispersion of the signal across the signal spectrum.

Preferably, said measurement of the optical signal is selected from maximising a monitor of the received eye opening, minimising a bit error rate or optimising the electrical spectrum of the optical signal reflected from the Bragg reflector.

The invention also provides for a system for the purposes of polarisation mode dispersion compensation which comprises one or more instances of apparatus embodying the present invention, together with other additional apparatus.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference the accompanying figures in which:

FIG. 5b is a schematic graphical representation of the refractive index profile of the sampled grating fibre of FIG. 5a;

FIG. 7b is a schematic graphical representation of the grating pitch as a function for the separate modes conducted via the fibre of FIG. 7a.

DETAILED DESCRIPTION OF THE PREFERRED EMBODIMENTS

Embodiments of the present invention are described below by way of example only. These examples represent the best ways of putting the invention into practice that are currently known to the applicant although they are not the only ways in which this could be achieved.

Figure 1:
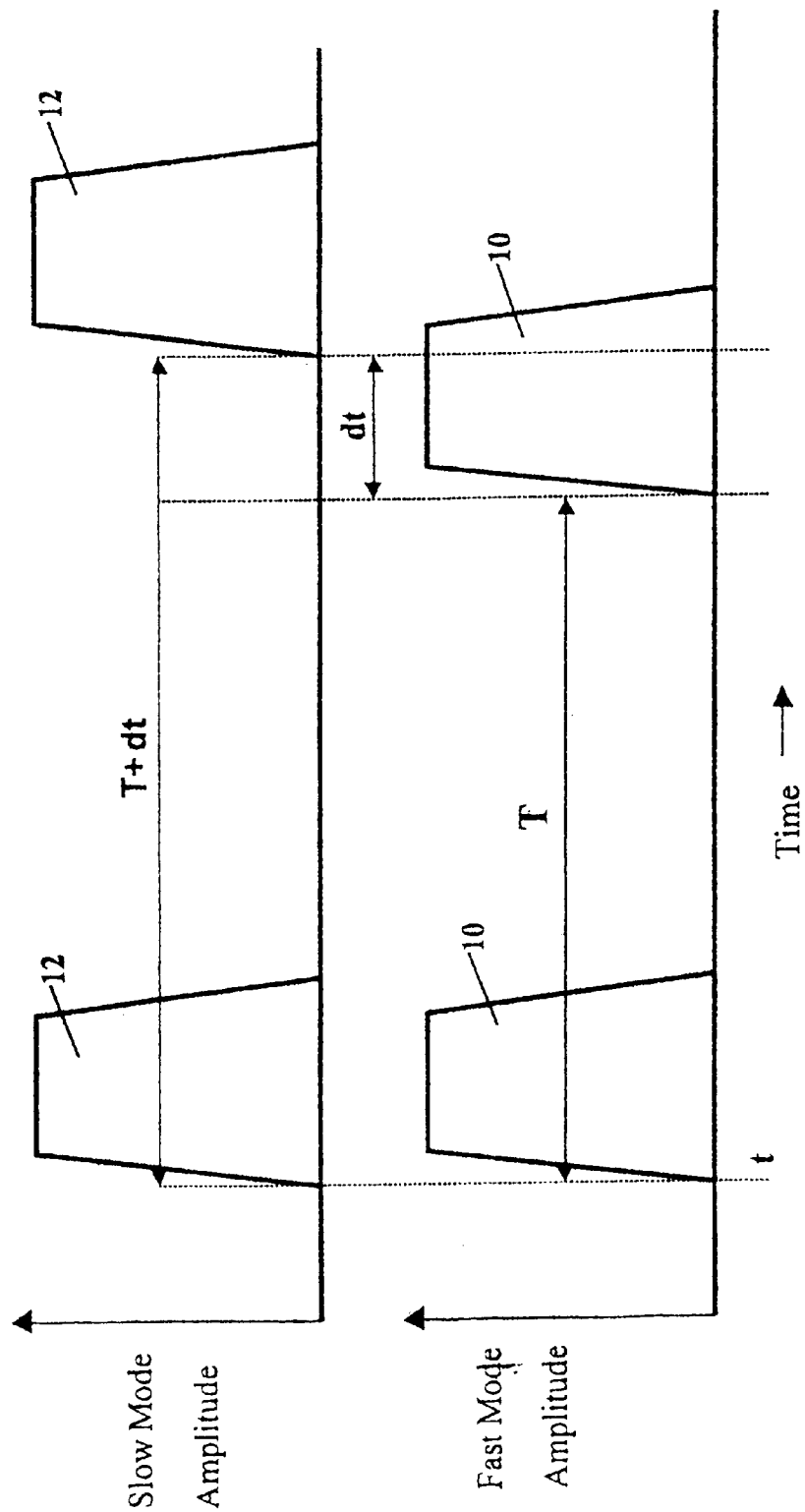
FIG. 1 is a schematic illustration of first order polarisation mode dispersion.
Figure 2:
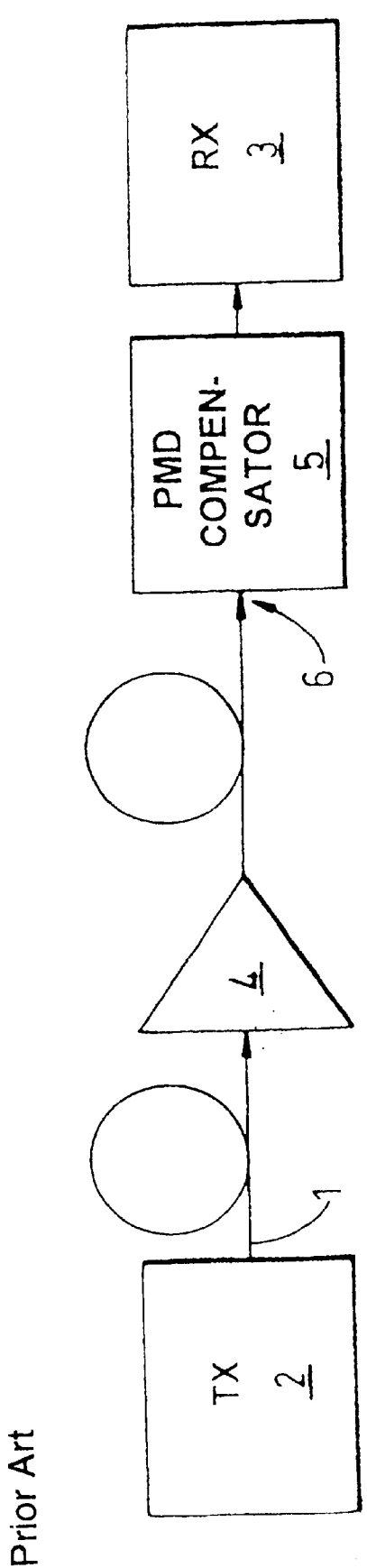
FIG. 2 is a schematic diagram of part of an optical communications system including a polarisation mode dispersion compensator.
Figure 3:
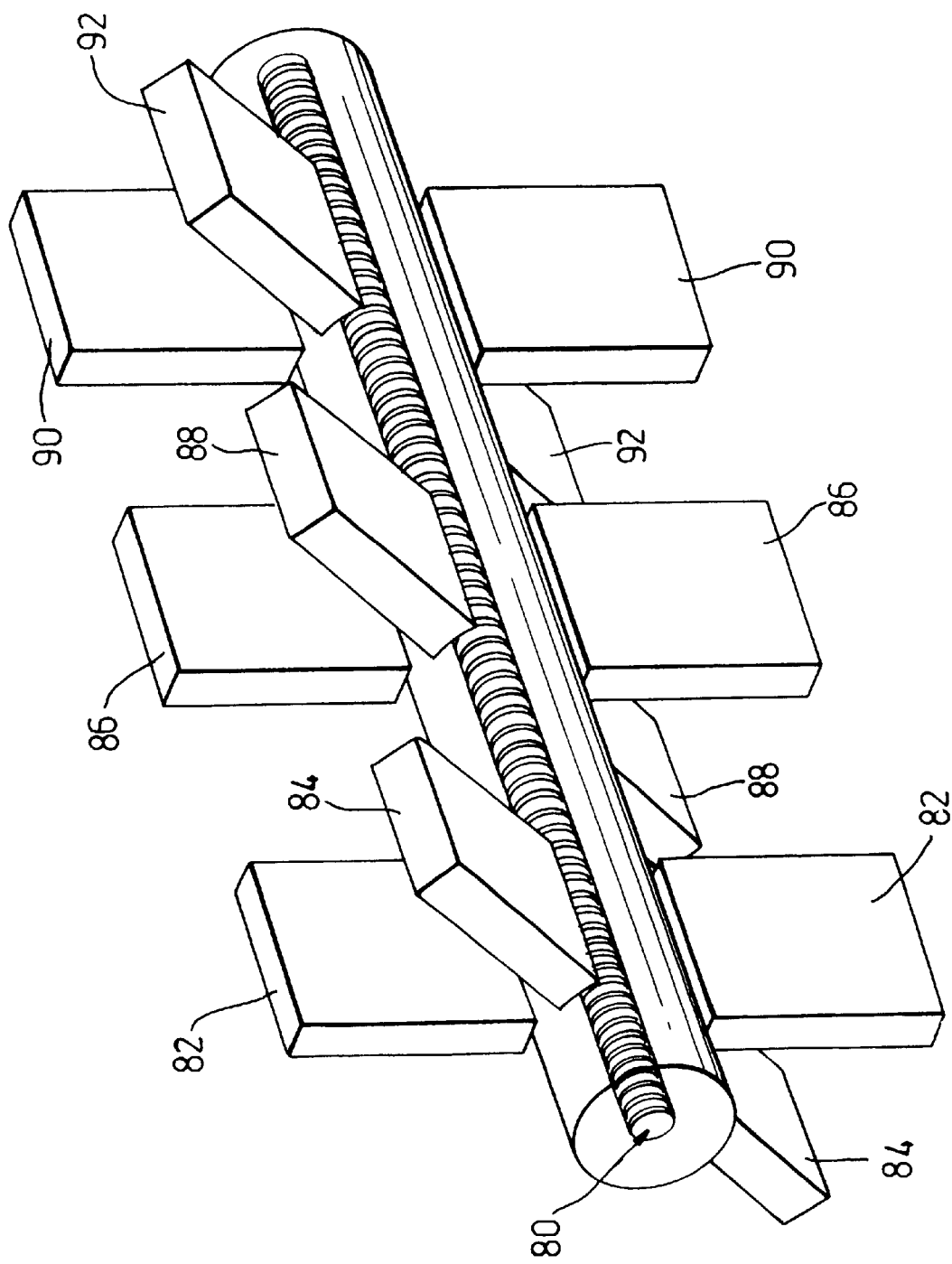
FIG. 3 is a schematic illustration of a section of the apparatus for providing a differential delay to different parts of the signal spectrum for polarisation mode dispersion compensation according to the preferred embodiment of the present invention.

FIG. 3 shows a preferred embodiment of an optical fibre in which the fibre core (80) has an axial chirped photorefractive Bragg grating such that this grating reflects light at different frequencies along its length.

The relative frequency between the extended signal spectrum and the grating response, is such that the extended spectrum of the modulated signal causes the power from different parts of the signal spectrum, to be reflected from different regions of the fibre. In this particular embodiment, the chirp is monotonic.

The entire spatial extent of the full reflected spectrum is divided into a number of sections N (three of which are shown in FIG. 3). For each of these sections:

(a) The fibre is squeezed by a minimum of two squeezers (82, 84; 86, 88; and 90, 92), which together comprise one tuning means.

(b) Each squeezer consists of a means of providing a transverse stress to the fibre. These squeezers may be controlled by electrical actuators such as PZT, Electrostrictive or magnetostrictive devices.

(c) The two squeezers are placed at approximately 45 degrees to each other. The two squeezers may be staggered slightly with respect to each other to simplify the mechanical configuration.

(d) By controlling (1) the magnitude, and (2) the relative magnitude of the transverse stress applied by these two squeezers, it is possible to control both the magnitude and the orientation of the stress induced birefringence.

Although each section is shown as having tuning means separated from those of the adjacent section, it will of course be appreciated that the tuning means of any section might be adjacent to the tuning means of the subsequent section. Similarly, whilst the tuning means are shown as all being orientated in the same directions relative to the fibre, each tuning means could be orientated in any direction as might be required, for example, to allow for mechanical constraints of the control apparatus.

Figure 4A:
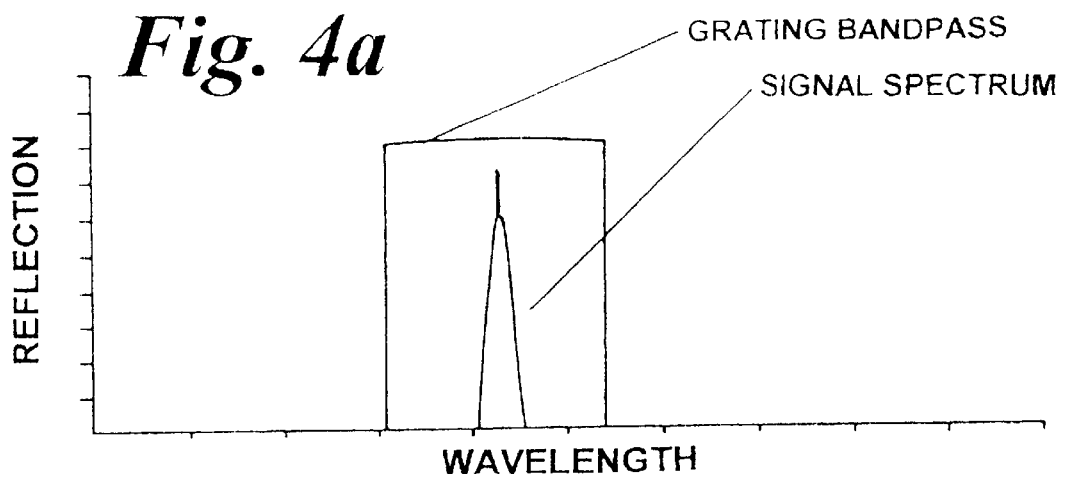
FIG. 4a is a schematic graphical representation of the spectral profile of a grating fibre.
Figure 4B:
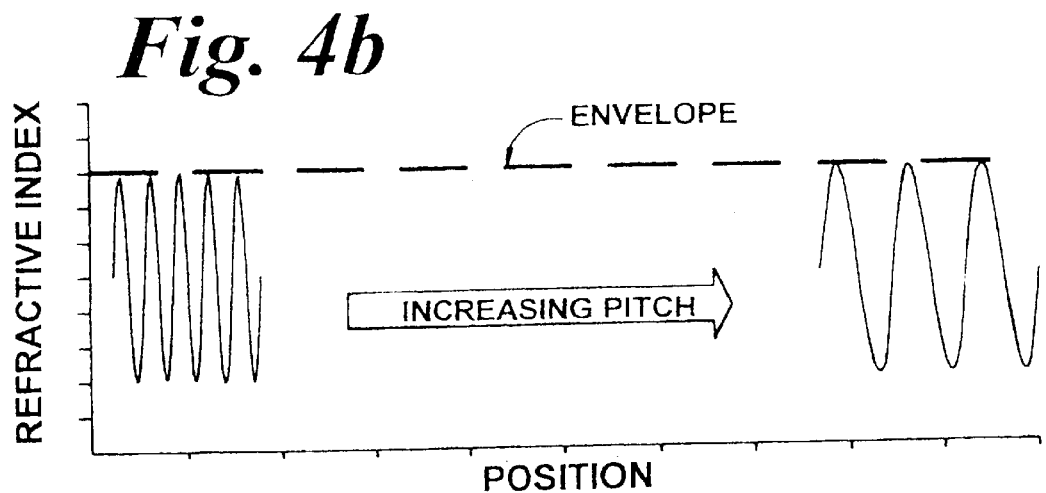
FIG. 4b is a schematic graphical representation of the refractive index modulation of a fibre grating.
Figure 4C:
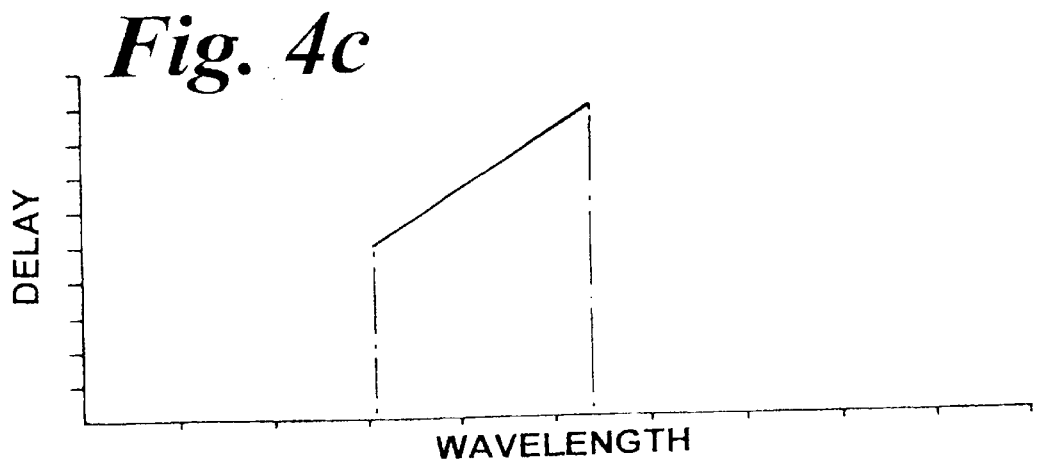
FIG. 4c is a schematic graphical representation of differential delay as a function of wavelength in a chirped fibre grating.

FIG. 4 indicates the reflection characteristics of the chirped grating, as might be used in the device shown in FIG. 3. The reflection characteristics have a finite bandwidth as illustrated in FIG. 4a which diagrammatically shows a spectral profile of the reflection properties of a grating fibre with a linear chirp characteristic, and for which the refractive index modulation defining the grating is uniform along the length of the grating as shown in FIG. 4b. The delay introduced by the grating fibre is linearly dependent on wavelength within the passband of the grating fibre as shown in FIG. 4c. The effect of this wavelength dependence may be utilised to provide compensation for chromatic dispersion in the optical signal. The amount of chromatic dispersion increases with the amount of chirp present in the grating fibre, ie. with the gradient of the chirp characteristic, so that in general a degree of chromatic dispersion compensation may be selected by design choice of the magnitude and sign of the gradient of chirp characteristic of the fibre.

Although in its simplest form the device might contain only two sections (thus allowing for some variation of PMD across the signal bandwidth) it would be possible to provide as many sections as it would be desirable to control independently. The control means could be one which optimised each sections birefringence condition to maximise a monitor of the received "eye" opening, minimised the bit error rate (BER) or optimised the electrical spectrum of the received signal.

Clearly, other control means could be used as would be apparent to the skilled person, such as the control means described in the prior art.

One advantage is that this particular compensator design requires no State Of Polarisation (SOP) controller, as the same device provides SOP control and PMD compensation. Consequently, a first order controller alone would require only one section of fibre and one tuning means.

An optical signal may comprise a plurality of wavelength division multiplexed signal components. Each signal component (or channel) is of a different wavelength and may carry a different information stream. The ITU (International Telecommunication Union) have standards concerning the position and separation of the wavelengths of such channels. Clearly, the device could be utilised to provide simultaneous PMD compensation across two or more of the channels of such a WDM system.

However, it is envisaged that the device as described would only work for one specific channel wavelength. This could be one of the ITU standard wavelengths. However it would be inconvenient to have to provide a large inventory to meet the demands of such multi-channel systems. One solution is to replace the continuous grating with one which is "sampled". That is one which has short regions of grating separated by regions with no grating. The result of such a spatial modulation of the grating strength, is that the grating spectral response has multiple equally spaced sidebands. These replicas of the central response may be deliberately spaced at the ITU spacing (e.g. 100 GHz), thus allowing a single design to be used for a large number of different channel wavelength. Each channel requiring PMD compensation might utilise one such PMD compensator.

Figure 5A:
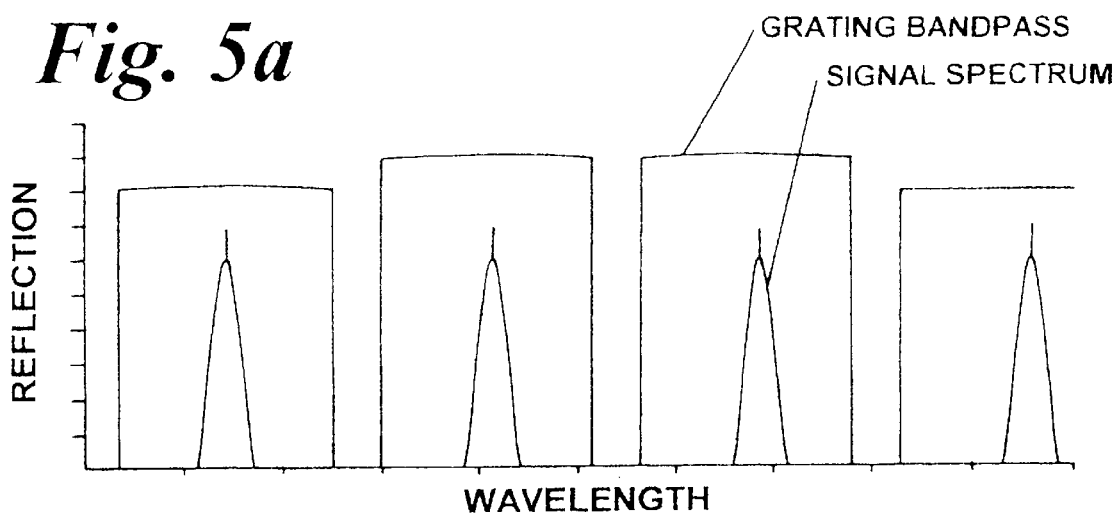
FIG. 5a is a schematic graphical representation of part of the spectral response of a sampled grating fibre.
Figure 5B:
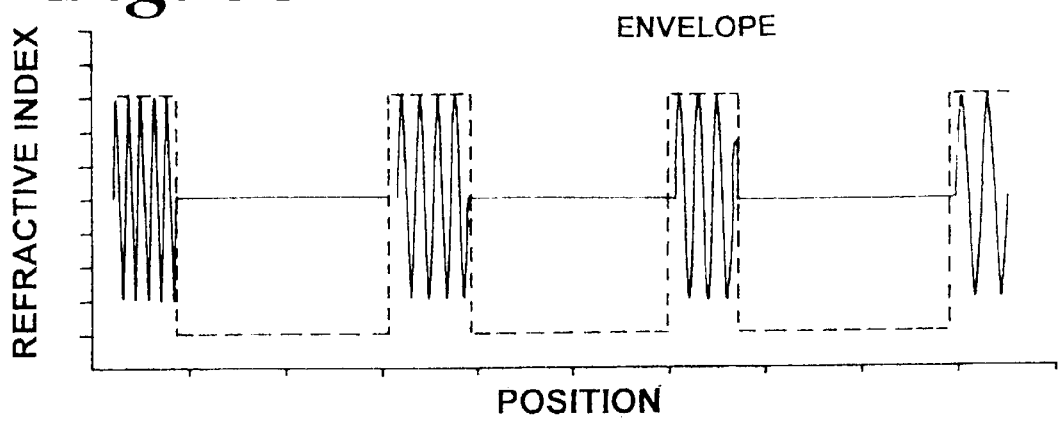
Figure 5C:
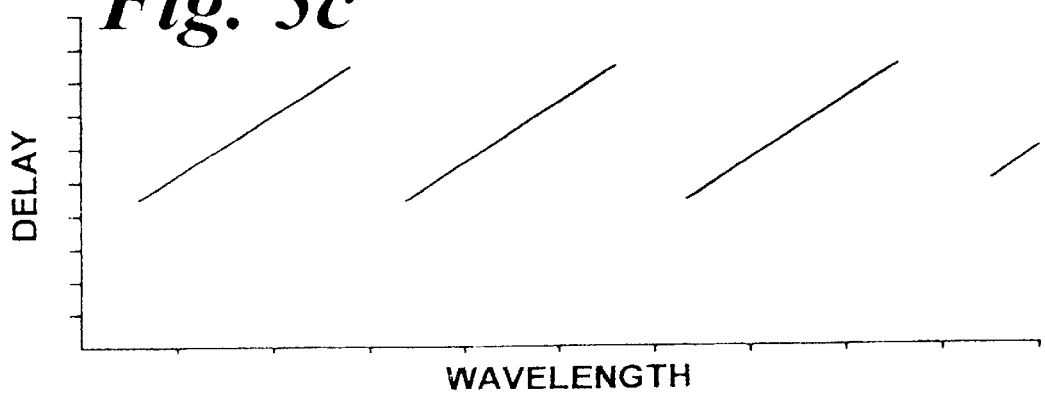
FIG. 5c is a schematic graphical representation of the delay characteristic as a function of wavelength for the sampled grating of FIGS. 5a and 5b.

FIG. 5 illustrates the characteristics of such a sample grating. FIG. 5b illustrates the refractive index N as a function of distance along the grating fibre. Whereas in FIG. 4b the refractive index is modulated approximately sinusoidally with uniform envelope, the modulation of FIG. 5b consists of periods of sinusoidal modulation of a fixed level envelope separated by its falls of zero modulation in a periodic manner. Such sampled gratings have a frequency response characterised by a series of periodically spaced passbands as illustrated schematically in FIG. 5a, which, by appropriate modulation of the refractive index envelope in FIG. 5b, are selected to coincide substantially with the wavelengths of the multiplex components of the optical signal. As illustrated in FIG. 5c, each passband may have substantially the same delay characteristic as a function of wavelength when reflected by Bragg reflection in the optical fibre or fibres.

Whilst in the above preferred embodiment, the tuning means have been provided by two squeezing means, it will of course be appreciated that the tuning means could be replaced by any apparatus or technique that may be used to apply a predetermined change in the birefringence of the fibre. For instance, each tuning means could be formed of a single squeezer, the orientation of which around the axis formed by the optical fibre might be adjusted. Alternatively, tuning means might comprise heating or cooling means arranged to differentially heat or cool appropriate parts of the fibre and hence adjust the birefringence characteristic. Alternatively, by appropriately bending the fibre, and appropriate control not only of the degree of bend but also the direction in which the fibre bends, it is possible to impart strains to the fibre so as to change the stress induced birefringence to provide the appropriate conditions so as to alleviate the birefringence provided by the transmission fibre of the telecommunications system.

Figure 6:
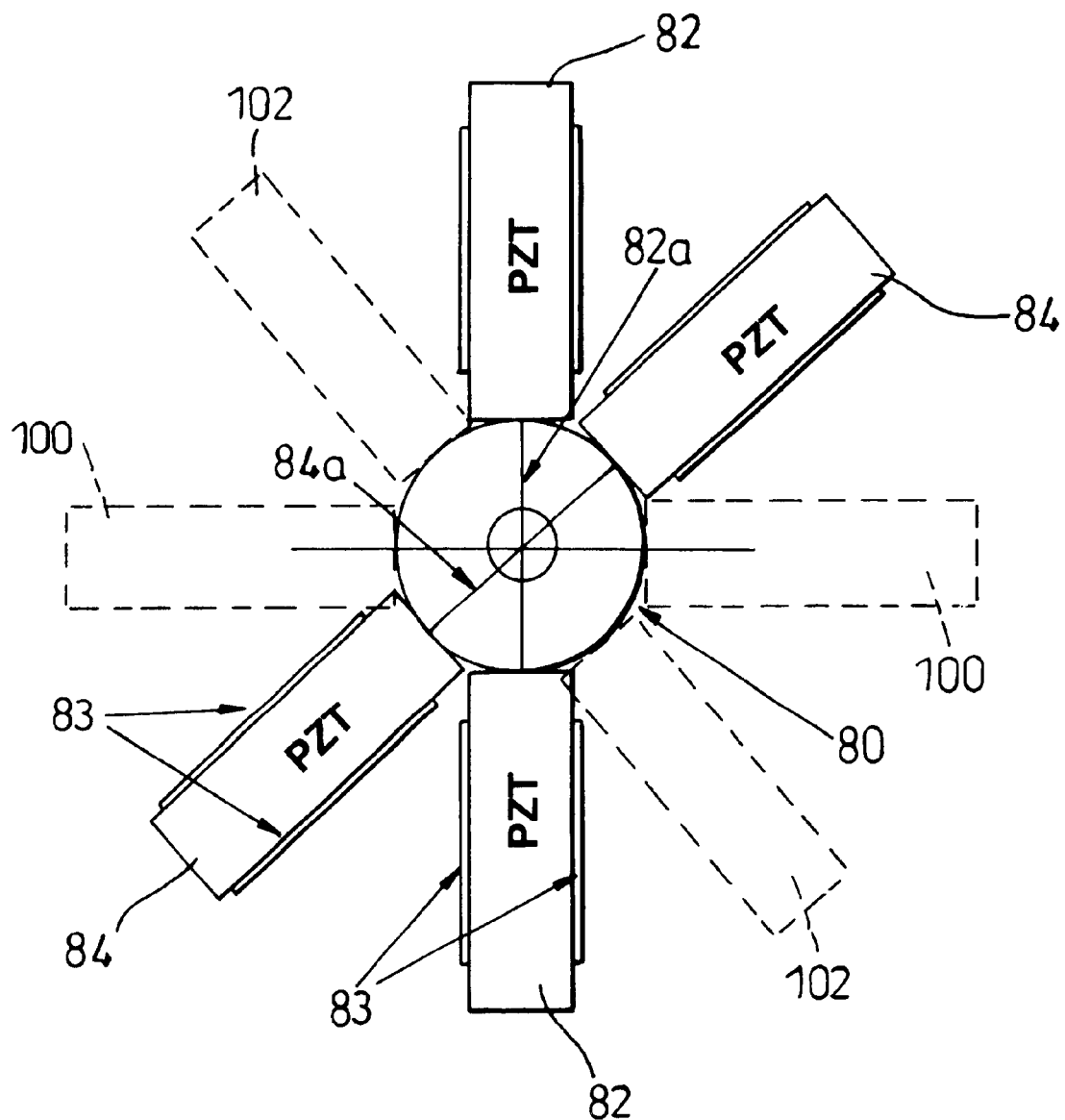
FIG. 6 is a cross-sectional view of an alternative embodiment of the present invention.

FIG. 6 shows a single section of an embodiment, in which an optical fibre 80 has two squeezing elements 82, 84 arranged to control the axis and magnitude of the stress induced birefringence. It is envisaged that the squeezing elements would squeeze said fibre along the axis 82a, 84a. Additionally, the section would include at least one of two further squeezing elements 100, 102, which would be arranged respectively orthogonal to 82 and 84. In this embodiment, each squeezing element is formed of PZT, controlled by electrodes 83. By applying orthogonal (perpendicular) stresses to the fibre axis (e.g. by using squeezing elements 82 and 100, and/or 84 and 102), the refractive index of the fibre may be adjusted, altering the chirp characteristics of the grating and hence permitting the grating band pass to be tuned to a desired wavelength range. This effect might be used to ensure that the band pass is aligned with the specific ITU channel which is being compensated. Alternatively, it can be used to ensure that the fibre acts as a controllable delay mechanism.

Whilst this embodiment shows separate squeezing elements surrounding the fibre axis, it will be appreciated that alternatively stress (tensile or compressive) imparting devices could be utilised to produce a similar effect. For instance, a continuous (or segmented) annulus of material surrounding the fibre, e.g. a PZT ring of material, might be used to apply the desired compressive forces to the fibre. Alternatively, hydrostatic forces can be applied to the fibre i.e. the fibre could be immersed in a liquid container, and the liquid pressure controlled to achieve a similar effect.

Whilst in the preferred embodiment, no state of polarisation controls are required, it will of course be appreciated that such devices may be utilised, as described in the prior art. Further, whilst in the preferred embodiment a single piece of optical fibre is utilised to provide polarisation mode dispersion compensation for both modes of the optical signal, it will of course be appreciated that each mode may be compensated for separately in different pieces of fibre. Equally, whilst in the preferred embodiment an optical fibre is used as the waveguide, it will be appreciated that the waveguide is not restricted to being a fibre and equally need not be formed of silica. For instance, the waveguide may be formed of polymeric material.

FIG. 7 shows the first two sections of such an alternative arrangement, in which the first and second grating fibres (25) and (26) are fused together in side by side configuration so as to co-extend along a support (48) to which the resulting fused fibre assembly (53) is clamped at a first end (54).

Figure 7A:
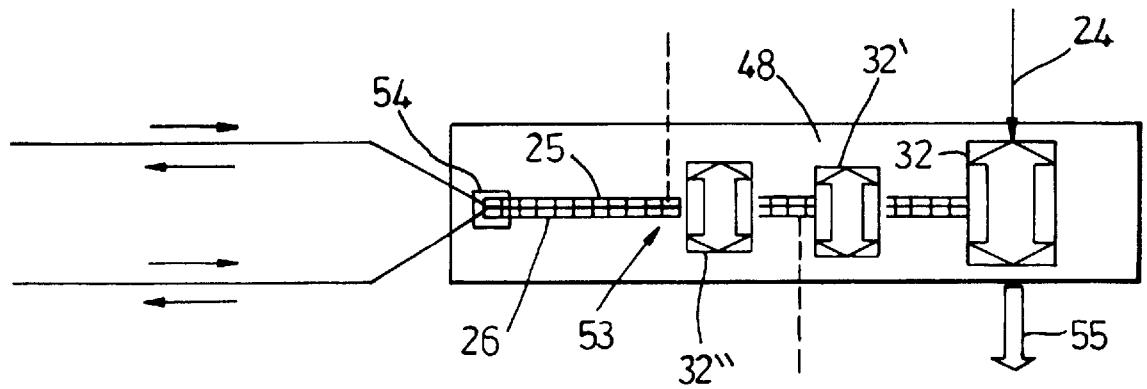
FIG. 7a is a schematic representation of a section of an alternative differential delay element having a polarisation maintaining fibre.
Figure 7B:
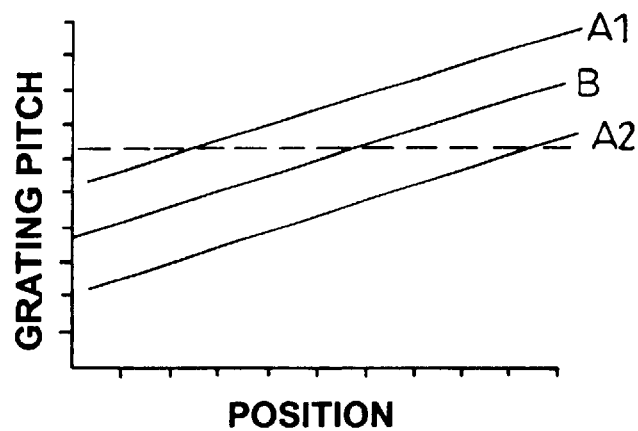

Dimensional control elements (32, 32', 32") are each arranged to apply a bending moment to the fused fibre assembly (53) relative to the support (48) so as to effect bending. In FIG. 7a, bending in the direction of arrow (55) due to 32 for example will result in longitudinal extension of first fibre (25) and longitudinal compression of the second fibre (26), thereby increasing the pitch grating in the first fibre (25) and decreasing the pitch in fibre (26) at each position along the length of the respective fibres. This is illustrated graphically in FIG. 7b, where B is the chirp characteristic for the unstrained fibres (25 and 26) and curves A1 and A2 are the chirped characteristics when strained in direction (55).

The dimensional control element (32) in FIG. 7a may be any suitably electrically operated actuator such as a solenoid or piezo electric device controlled by the control signal 24. Clearly, such a device utilising only one control element (32) would only provide first order polarisation mode dispersion compensation. In order to provide higher order polarisation mode dispersion compensation, additional chirped sections of optical fibre would be strained by the appropriate tuning means (eg further dimensional control elements 32', 32").

Other variations fall within the scope of the appended claims will be apparent to those skilled in the art in the light of the above disclosure.

What is claimed is:

1. An apparatus for compensating for polarisation mode dispersion, the apparatus comprising a chirped Bragg reflector extending longitudinally along an optical waveguide, said waveguide being susceptible to stress birefringence; and at least one tuning means located at a position along the length of said waveguide, said tuning means being operable, in use, to apply a stress to said waveguide so as to alter the magnitude and the orientation of the birefringence of said waveguide for compensation of the polarisation mode dispersion of the optical signal.

2. An apparatus as claimed in claim 1, said apparatus comprising at least two of said tuning means, each tuning means being located at a different position along the length of said waveguide.

3. An apparatus as claimed in claim 1, wherein said optical waveguide comprises a birefringent material arranged such that the magnitude and orientation of the birefringence is, in use, controlled by stress imparted by said tuning means.

4. An apparatus as claimed in claim 1, wherein said tuning means are arranged such that in use the position of the tuning means in relation to the waveguide may be adjusted.

5. An apparatus as claimed in claim 1, wherein at least one of said tuning means comprises two squeezing means in mutual proximity, and arranged such that in use said squeezing means can apply pressure to said waveguide along respective axes at a relative angle of θ to each other, θ being greater than zero, so as to provide a transverse stress to said waveguide for tuning of said birefringence.

6. An apparatus as claimed in claim 5, wherein said squeezing means comprises electrical actuators.

7. An apparatus as claimed in claim 5, wherein θ is approximately 45°, the apparatus further comprising a third squeezing means, in mutual proximity with said first two squeezing means, arranged to apply pressure to said waveguide along an axis substantially perpendicular to one of said axes of said first two squeezing means.

8. An apparatus as claimed in claim 1, further comprising at least one longitudinal strain tuning means arranged such that in use a longitudinal tensile or compressive strain may be applied to at least a longitudinal section of said waveguide.

9. An apparatus as claimed in claim 1, wherein said optical waveguide comprises an optical fibre, and at least one of said tuning means comprises an actuator arranged to apply a variable bending moment to said fibre.

10. An apparatus as claimed in claim 1, wherein said Bragg reflector comprises a chirped sampled grating.

11. An apparatus as claimed in claim 1, further comprising a control means for control of said tuning means, said control means being arranged to, in use, successively optimise the birefringent conditions of a pre-determined bandwidth of said optical signal.

12. An apparatus as claimed in claim 11, wherein said optimisation is selected from maximising a monitor of the received eye opening, minimising the bit error rate or optimising the electrical spectrum of the return path of the optical signal from the apparatus.

13. A telecommunication system comprising an apparatus as claimed in claim 1.

14. A telecommunication system as claimed in claim 13, wherein said apparatus is being used to provide polarisation mode dispersion to an optical signal.

15. An operator utilising a telecommunication system as claimed in claim 14.

16. A method for compensating for polarisation mode dispersion across the signal spectrum of an optical signal, the method comprising transmitting an optical signal along an optical waveguide which is susceptible to stress birefringence, and which has a chirped Bragg reflector extending longitudinally along said waveguide;

measuring the optical signal so as to provide an indication of the polarisation mode dispersion; and applying stress to said waveguide at a position along the length of said waveguide so as to adjust the waveguide birefringence for compensation of polarisation mode dispersion of the signal.

17. A method as claimed in claim 16, wherein said optical signal is measured so as to provide an indication of the polarisation mode dispersion across the signal bandwidth; and said stress is applied at at least two distinct positions along the length of said waveguide so as to adjust the waveguide birefringence for compensation of polarisation mode dispersion of the signal across the signal spectrum.

18. A method as claimed in claim 16, wherein said measurement of the optical signal is selected from maximising a monitor of the received eye opening, minimising a bit error rate or optimising the electrical spectrum of the optical signal reflected from the Bragg reflector.

* * * * *